Patented May 16, 1939

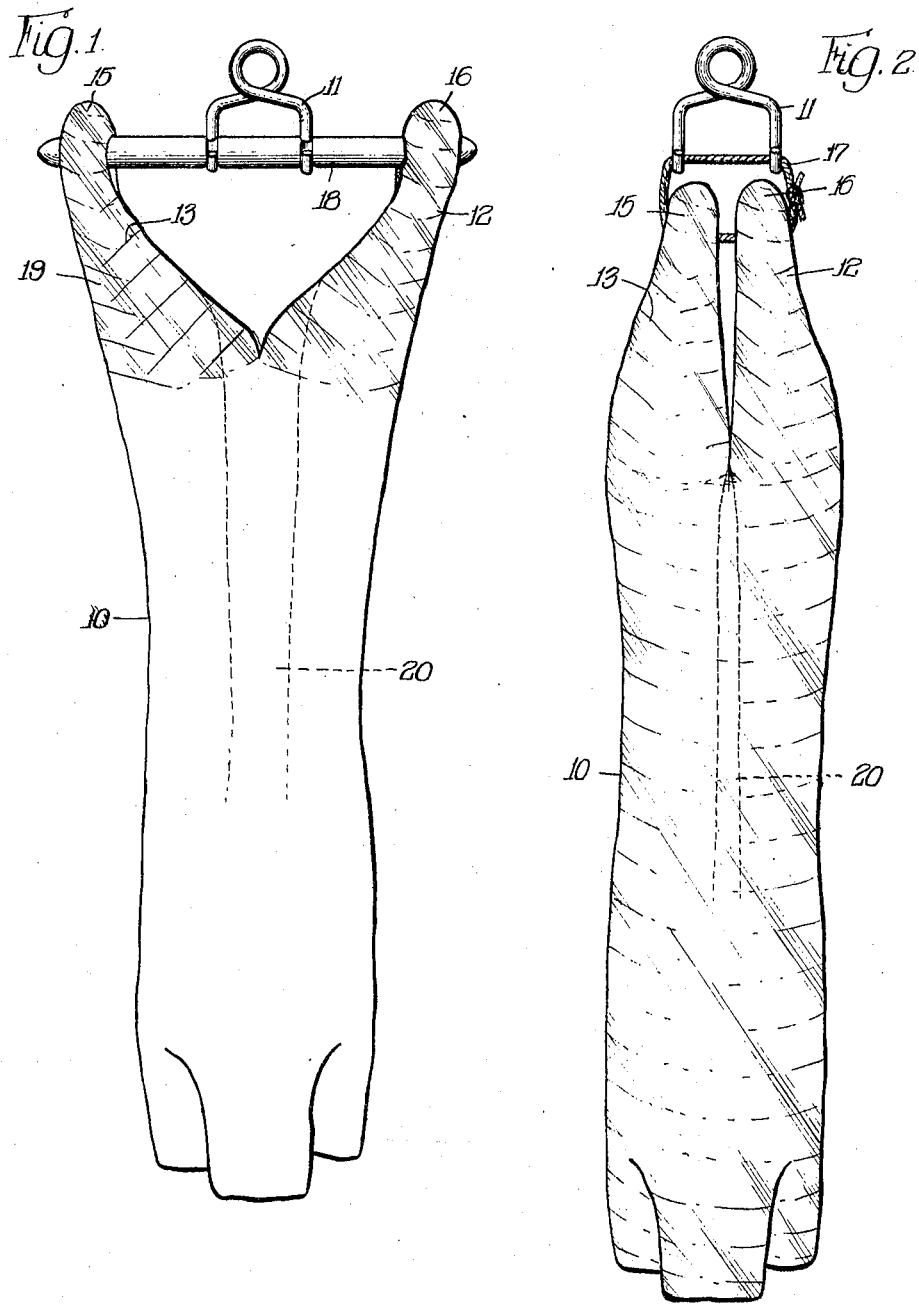

2,158,462

UNITED STATES PATENT OFFICE 2,158,462

PROCESSING OF VEAL CARCASSES

Harry J. Koenig, Chicago, Ill., assignor to Armour and Company, Chicago, Ill., a corporation of Illinois Application July 31, 1937, Serial No. 156,667

5 Claims. (Cl. 99—174)

The present invention relates to the processing of meats and has particular reference to the processing of carcass veal and the packaging of the same for market.

In the packaging of fresh carcasses today the meat is normally protected from contamination by being covered with cheesecloth, muslin, stockinette or other fabric and then frequently inclosed within a paper sack of some kind for further protection. Before being packaged for shipment the carcasses while in the cooling room are sometimes covered with paper or cloth saturated in a brine solution that tends to smooth the outer fatty portions of the carcass and to some extent preserve the bloom and fresh appearance.

Because of the thick layer af protective fat on beef, sheep, and pork carcasses such treatment is usually sufficient, as oxidation and the ensuing discoloring of the meat takes place slowly. In veal carcasses there is little or no fatty layer and the fel is partly removed with the skin leaving the meat itself exposed to the air. In this condition oxidation takes place rapidly, discoloring the meat and spoiling its appearance. This is especially noticeable where the veal carcass is skinned warm as the internal body heat hastens this discoloring and dries out the thin fatty fel that may be present.

For this reason a great many of the dressed calves today are marketed with the hide on as the dealers demand a bright vealy colored product at the time of cutting and sale to the consumer. The natural hide of the animal has been considered the best protection for the carcass in preventing oxidation and from the bacteria, molds and slimes present in the atmosphere which react upon the otherwise unprotected carcass. The hide is an expensive covering for the veal carcass, however, as it is normally worth more per pound than the meat itself. Moreover, it is heavy, adds freight costs, must be removed by the butcher who may reduce its value by careless skinning, and it does not furnish the protection to the carcass against excess shrinkage that is so desirable.

Calf skins, when the work is performed by the packers, are removed under expert workmanship and show a high percentage of Number 1 or uncut skin. Surveys show that calf skins removed by the butcher or dealer have a high percentage of Number 2 or cut skins.

When shipped with the hide off, the veal carcass is first chilled from 12 to 24 hours after killing and the skin is then removed from the chilled carcass by experts with excellent results. This cooling with the hide on prevents the immediate discoloration of the carcass surface that would take place if it were skinned warm. There is a distinct disadvantage, however, both to this process and the one above described where the hide is left on until the market is reached and that is the shrinkage of the carcass in weight due to the evaporation of the natural juices in the meat causing loss of flavor and, in the long run, loss of money to packer and dealer as this shrinkage continues during refrigeration. Continued refrigeration with the hide off shows a discoloration and loss of bloom.

These former packaging methods serve to retard oxidation but little in a veal carcass. The wrappings are pervious and admit the air which carries bacteria, molds and slimes to the meat, contaminating it, and they allow an undue amount of moisture and natural juices to escape from the meat by evaporation causing a shrinkage in weight and loss of flavor.

One object of this invention is the processing of meat carcasses, especially veal, to enable them to be shipped inexpensively without shrinkage of weight or contamination while enhancing the appearance and salability of the article.

Other objects of this invention are to prevent the oxidation or discoloration of veal carcasses; to maintain the weight of a carcass at a maximum and reduce shrinkage therein; to retain the natural juices in a carcass, thus improving the meat flavor over that of the present meat bought by a consumer; to enhance the appearance of the carcass by bleaching it and thus preserving the bloom without artificially added constituents; to provide a new and improved package for meat carcasses; to provide an inexpensive method of preparing and shipping meat carcasses to market; and to improve the meat carcass during process and shipment and with less expense than by means heretofore used.

For aiding in a clear understanding of the invention there is shown in the accompanying drawing forming part of this specification one embodiment of certain arrangements of structure by reference to which the method and finished article are described.

In the drawing:

Fig. 1 is a view of a carcass partially processed and wrapped; and

Fig. 2 is another view of the carcass showing a further step in wrapping.

To accomplish the results heretofore set out the killed calf is preferably first removed to a chilling room as quickly as practicable, either surface chilled or completely chilled, skinned carefully and sealed at once against the atmosphere by an approximately moistureproof or at least a semi-moistureproof covering applied tightly to the contours of the carcass so that as little air as possible is left between the covering and the carcass. The natural moisture of the carcass is permitted to collect upon the surface of the carcass beneath the covering and noticeably tends to bleach the carcass during the period of delay necessary in placing the carcass in the market whereby to restore or preserve the natural bloom. By this action, the appearance of the carcass is greatly improved. The natural juices cannot escape so that the meat is maintained as to its flavor and the carcass cannot become contaminated through deleterious organisms.

Where prevention of shrinkage is a primary object, the carcass may be sealed on the killing floor upon removal of the hide and while the surface is still warm. In this practice it should be remembered that the internal heat of the animal causes a rapid drying of the surface and either the covering or the surface of the carcass may be wetted, to furnish a sufficient hold upon the carcass to prevent slippage of the covering as it is being applied. This is unnecessary upon a partially surface-cooled carcass as the natural moisture has again appeared upon the surface.

It has been found that this treatment of the carcass reduces the shrinkage to a great extent and offers in this respect a better covering than the natural hide which permits evaporation.

With reference to the embodiment of the invention as disclosed in the drawing, it will be noted that there is shown a skinned calf or veal carcass 10 suspended in any customary manner from a hanger 11. Upon removal of the hide the carcass is enclosed or sealed against unrestricted evaporation or contamination, preferably by a wrapping 12 that is spirally wound about the carcass with overlapping edges 13. This overlap may be in the neighborhood of ½ inch or more. This wrapping is placed or pulled tightly about the carcass in order to effect as close contact as possible. An effective manner of wrapping the carcass has been found to begin with one hind leg as at 15 and wrap downwardly to the crotch portion and then begin with the other hind leg 16 while the legs are spread widely apart. After leg 16 has been wrapped, the body of the carcass is then wrapped and the carcass is finished with the fore legs. The tail is placed between the legs and is protected by the body and leg wrapping.

After the legs are sealed the carcass may be suspended in a manner to draw the legs closely together and bring the sides of the internal cavity 20 into closer proximity, and tending to close the same. This may be done as shown in Fig. 2 by suspending the carcass by the rope 17 through the legs instead of by the bar 18. The body portion is then wound completely around, closing over the internal cavity. At the top and bottom of the cavity a small opening may be allowed as this permits a breathing action and yet seems to have no injurious effect upon the carcass. The wrappings extending across the partially closed cavity form a baffle to prevent streams or currents of air from striking the interior.

If the carcass has been chilled with the rear legs spaced substantially apart as is shown in Fig. 1, the carcass will set to some extent in this position. After wrapping the body portion with the legs placed substantially together, the legs will tend to spring apart, spreading the body portion, thus tensioning the wrapping still further and holding it snugly in place.

By this tight wrapping no body or envelope of air is left adjacent the animal carcass externally to begin its deleterious oxidizing effect. The overlapped edges of the mostureproofed wrapping prevent the ingress of the air and substantially lessen the egress of moisture.

During the necessary continued refrigeration of the carcass that follows, either to further chill the same or while awaiting its destination in the market, a film of moisture collects upon the surface of the carcass and between it and the wrapper. This moisture is purely the natural juices of the meat. In forming on the carcass surface and being permitted to remain there, a bleaching action takes place that greatly improves the natural bloom of even a freshly killed and skinned calf. Upon removal of the wrapper this extra moisture immediately disappears and the carcass remains with a fine bloom, maintained poundage and flavor. Tests over a period of time show that the appearance is improved progressively while the carcass is not affected by the organisms present in the air and shrinkage is substantially checked over methods of treatment now in vogue.

For protection against deleterious organisms and for minimizing shrinkage the product generally known as "Cellophane" has been used by me to advantage in carrying out the present invention. Normal "Cellophane" like ordinary paper is pervious to air and moisture and permits an undue evaporation with consequent shrinkage and surface drying. Completely moistureproofed "Cellophane", like a rubberized or asphaltic or glaze material, permits an excessive amount of animal moisture to collect beneath the same upon the surface of the carcass and precludes that breathing action to which I ascribe the ideal bleaching effect and enhancement of the natural bloom. Semi-moistureproof "Cellophane", that is, partially moistureproofed such as by a coating on one side only, has been found to give the best results as evaporation is permitted sufficiently to prevent undue accumulation of moisture and to cause a breathing action resulting in the desired bleaching and improvement of the bloom.

The term "Cellophane" is used in a generic sense to designate a transparent cellulose product of the type popularly so denominated and not as applying specifically to material of a certain manufacture. Also the term "semi" as applied to the degree of moistureproofing is used in its accepted meaning of partially and not as definitely one-half.

One-pound rolls of this preferred "Cellophane" in 5½ inch widths have been used to advantage for this wrapping and will cover several dressed calves at a much lower cost to the packer than that of the hide. Moreover, freight costs on shipping the hide are avoided and the packers have the valuable hide for their use or sale. This material may be applied directly from the spool or roll to the skinned carcass by hand. In applying the wrapping it may be found advantageous to twist the material at times as at 19 to cause the wrapping to conform more closely to the carcass contours while winding. This wrapping treatment is an improvement upon the natural hide and will bring the carcass to the butcher in better shape both from a flavor and shrinkage standpoint and in appearance. Tests have shown that a carcass so treated will shrink but one-half pound to one pound where similar carcasses otherwise treated will have a loss by shrinkage of more than twice these amounts. During continued refrigeration, the appearance improves.

Other meats, such as beef, sheep and pork are naturally protected by the heavy fat layers and are free from many of the objectionable things that attack the veal carcasses, and consequently this treatment is not so necessary for them, although many of the desirable features attributable to this treatment are in a measure present in carcasses so processed.

Frozen fish and some meats such as hams shipped to warm countries or stored for great lengths of time have been sealed against the atmosphere and refrigerator burns by various metal foils or asphaltum coverings and other materials impervious to moisture, air and light. In these instances the protective skins of the goods are not first removed nor is the bleaching effect wanted or obtained. In fresh veal carcasses however some breathing action is required to keep the carcass in prime condition. In the embodiment described this is accomplished by the unsealed overlap of the wrappings and by the use of the semi-moisture-proofed material.

Various modifications of this treatment and package can be made by persons skilled in the art without departing from the scope of this invention and will be obvious to them upon a reading of the foregoing description, the drawing and the appended claims.

I claim:

1. The method of processing veal carcasses including removing the hide after killing, tightly wrapping the carcass with a semi-moisture-proofed material with overlapping edges to lessen evaporation of moisture and reduce contact of the air with the carcass, permitting collection of moisture upon the surface of the carcass beneath said material, and bleaching the surface of said carcass by said moisture.

2. The method of bleaching and conserving shrinkage in a freshly skinned veal carcass which includes wrapping the freshly skinned carcass with semi-moistureproof Cellophane or like transparent material, said wrapping being applied to the exterior of the carcass spirally with overlapping margins, thus reducing while not wholly preventing evaporation and thus bleaching by means of trapped animal moisture.

3. A method of treating a veal carcass to bleach the same and reduce shrinkage including suspending the carcass with the rear legs spaced substantially apart, tightly wrapping the rear legs with a partially moistureproofed material, springing said legs into close proximity to reduce the body circumference and reduce the internal cavity, wrapping the body portion and remainder of said carcass while so contracted in said moistureproofed material and allowing body moisture to collect upon the external surface beneath said wrappings to bleach the same.

4. A method of bleaching and reducing shrinkage in veal carcasses including applying a tightly and spirally wrapped semi-moistureproof bandage with overlapped edges to said carcass to fit the external contours of the same whereby to permit evaporation of excess moisture while preventing contact of air with the carcass, and permitting some moisture to gather beneath the bandage upon the carcass surface to bleach the surface upon continued refrigeration.

5. The method of processing veal carcasses to reduce shrinkage, prevent oxidation, and preserve and improve the natural bloom, which comprises tightly wrapping the carcass with semi-waterproof material whereby restricted evaporation only of the natural juices is permitted and moisture is retained beneath the wrapping in sufficient amount to bleach and thus improve the natural bloom, the wrapping being applied while the carcass is circumferentially contracted and tensioned by allowing the carcass to expand.

HARRY J. KOENIG.